(12) United States Patent
Lefebvre et al.

(10) Patent No.: US 9,783,385 B2
(45) Date of Patent: Oct. 10, 2017

(54) ANTI-ROTATION BASED TORQUE MEASUREMENT DEVICE

(71) Applicant: The Montalvo Corporation, Gorham, ME (US)

(72) Inventors: Garett Lefebvre, Freeport, ME (US); Jonathan Hanson, Durham, ME (US)

(73) Assignee: The Montalvo Corporation, Gorham, ME (US)

( * ) Notice: Subject to any disclaimer, the term of this patent is extended or adjusted under 35 U.S.C. 154(b) by 0 days.

(21) Appl. No.: 14/823,418

(22) Filed: Aug. 11, 2015

(65) Prior Publication Data

US 2016/0046458 A1 Feb. 18, 2016

Related U.S. Application Data

(60) Provisional application No. 62/036,366, filed on Aug. 12, 2014.

(51) Int. Cl.
| | |
|---|---|
| *G01L 3/02* | (2006.01) |
| *B65H 23/04* | (2006.01) |
| *G01L 5/04* | (2006.01) |
| *G01L 3/10* | (2006.01) |
| *B65H 23/188* | (2006.01) |

(52) U.S. Cl.
CPC ....... *B65H 23/044* (2013.01); *B65H 23/1888* (2013.01); *G01L 3/10* (2013.01); *G01L 5/04* (2013.01); *B65H 2220/03* (2013.01); *B65H 2301/4132* (2013.01); *B65H 2301/41346* (2013.01); *B65H 2301/41366* (2013.01); *B65H 2403/725* (2013.01); *B65H 2403/7252* (2013.01); *B65H 2403/7253* (2013.01); *B65H 2515/322* (2013.01); *B65H 2553/212* (2013.01); *B65H 2557/61* (2013.01)

(58) Field of Classification Search
CPC . B65H 23/044; B65H 23/1955; G01L 5/0019; G01L 5/04; G01L 3/10
USPC ............................. 73/159, 862.191, 862.381
See application file for complete search history.

(56) References Cited

U.S. PATENT DOCUMENTS

| | | | | |
|---|---|---|---|---|
| 4,326,424 A | * | 4/1982 | Koenig ................. | G01L 1/2243 73/862.474 |
| 4,784,004 A | * | 11/1988 | Ekola ..................... | G01L 5/108 73/862.474 |
| 4,796,474 A | * | 1/1989 | Koenig .................. | F16C 13/02 73/862.632 |
| 5,190,232 A | * | 3/1993 | Brandon ................ | B65H 18/26 242/533.4 |
| 5,311,763 A | * | 5/1994 | Gibbs, Jr. .............. | G01N 19/02 73/9 |

(Continued)

*Primary Examiner* — Max Noori
(74) *Attorney, Agent, or Firm* — Schwegman Lundberg & Woessner, P.A.

(57) ABSTRACT

Apparatus and methods for web tension control are provided. In an example, an apparatus can include a tension beam configured to deflect in a predictive manner when under a force load, a first shaft directly coupled to the tension beam and configured to mechanically interface with a torque device, a second shaft directly coupled to the tension beam opposite the first shaft and configured to interface with a structural member of a web machine, and a strain gauge coupled to the tension beam and configured to provide an electrical representation of the force load.

21 Claims, 6 Drawing Sheets

(56) References Cited

U.S. PATENT DOCUMENTS

| | | | | |
|---|---|---|---|---|
| 5,975,136 | A * | 11/1999 | Heitzer | B62D 5/08 137/625.21 |
| 6,298,736 | B1 * | 10/2001 | Girard | G01L 3/108 73/862.328 |
| 2005/0081649 | A1 * | 4/2005 | Takahashi | G01G 19/12 73/862.474 |
| 2008/0202810 | A1 * | 8/2008 | Gomez | E21B 47/011 175/40 |
| 2010/0210371 | A1 * | 8/2010 | Sato | A63B 59/0074 473/223 |
| 2011/0162465 | A1 * | 7/2011 | Pekin | A01K 77/00 73/862.474 |
| 2014/0216173 | A1 * | 8/2014 | Chana | G01L 3/108 73/862.338 |

* cited by examiner

ANTI-ROTATION BASED TORQUE MEASUREMENT DEVICE

PRIORITY AND RELATED APPLICATIONS

This application claims the benefit of priority under 35 U.S.C. 119(e) to Lefebvre et al., U.S. Provisional Patent Application No: 62/036,366, filed on Aug. 12, 2014, and entitled, "ANTI-ROTATION BASED TORQUE MEASUREMENT DEVICE," which is hereby incorporated by reference herein in its entirety.

BACKGROUND

Many manufacturing or converting processes that employ a web of material can perform better with some form of tension control. Tension control is not limited to web processes. Early forms of tension control can involve a friction device such as a leather belt drape over a unwind roll of web material. Adding weight to the end of the leather belt could increase unwind tension and removing weight could lighten web tension. As technology improvements were applied to web processes, brakes, clutches or other torque devices could be coupled to unwind and rewind shafts to apply tension torque to the web material. For certain processes, such open loop tension control is inexpensive and can provide the necessary control to produce acceptable products. In processes that require tighter tension control, solutions often include applying additional sensors to the application and sometimes closing the tension loop with a tension transducer. However, the installation of sensors such as diameter sensors or tension sensors can involve significant expense or can prove impractical because of substantial re-configuring of the web processing equipment to accommodate such sensors.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
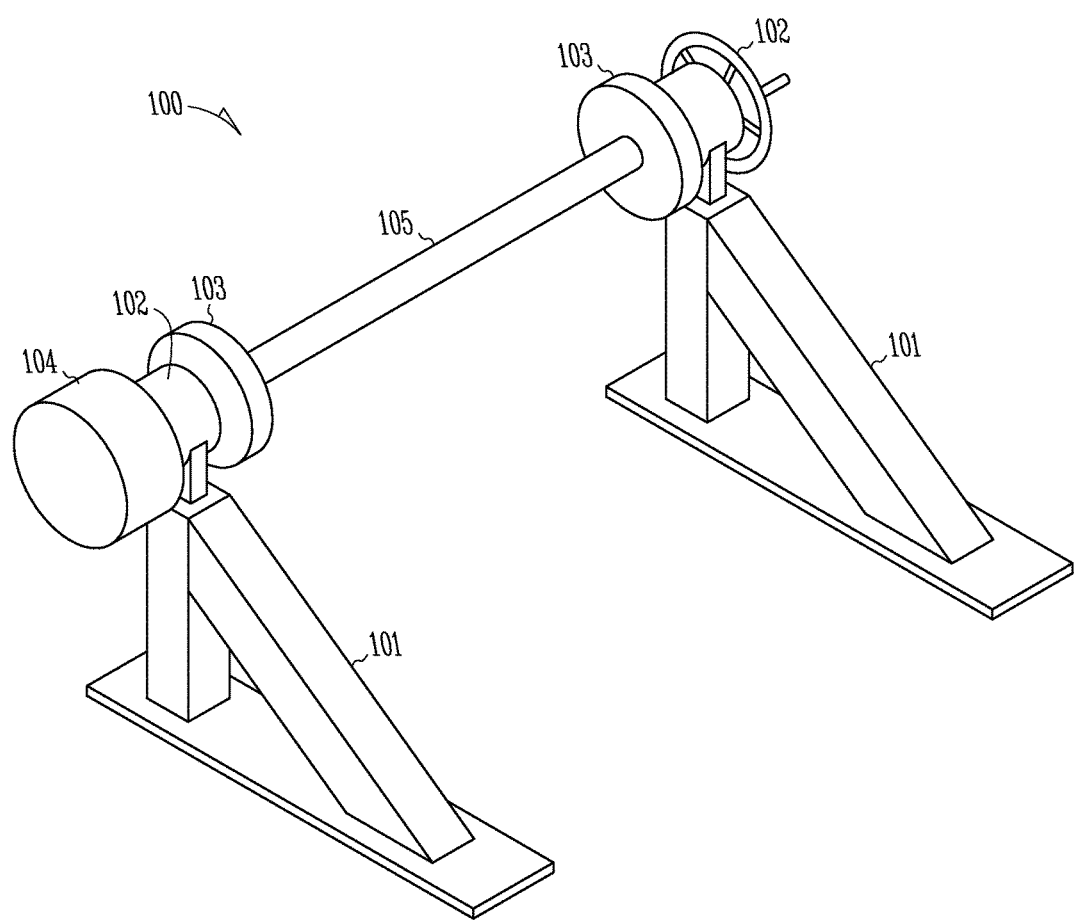
FIG. 1A illustrates an example tension control system for a web machine.

FIG. 1A illustrates an example tension control system 100 for a web machine. The tension control system 100 can include a roll support structure 101, first and second bearings 102, first and second safety chucks 103 coupled to first and second shafts (not visible), a tension generating device 104. In certain examples, the tension control system 100 can includes a controller (not shown). In certain examples, the safety chucks 103 can capture and release a roll shaft 105 of web material or a core and the bearings 102 and shafts can allow the roll shaft 105 to rotate so as to unwind the material for processing or rewind processed web material as scrap or as some form of finished or intermediate product. In certain examples, a roll shaft 105, such as an air roll shaft, can be inserted within a roll of material or a core and the ends of the roll shaft 105 can be captured in the safety chucks 103.

The tension generating device 104 can be employed to wind or unwind the web material under tension. In certain examples, the tension generating device 104 can include a brake for unwinding web material or a brake and motor (not shown) for rewinding web material. In certain examples, the brake can include, but is not limited to a pneumatic brake, a hydraulic brake, a motor under torque control, a magnetic brake, etc. The brake typically includes a rotating member that is coupled to one of the shafts, the brake shaft, and rotates with the brake shaft. The brake typically includes a stationary member that is secured to a fixed structure, such as the roll support structure 101. In operation, one of the members of the brake can be commanded, for example from the controller, to apply a friction force to the other member to resist or encourage rotation of the brake shaft. For mechanical brakes, such as pneumatic and hydraulic brakes, the stationary member of the brake typically, but not so limited, applies a friction force to the rotating member to create tension in the web. In magnetic or motor related brakes, one member can be commanded to control a magnetic force interactive with the other member to resist or encourage rotation of the brake shaft. In certain examples, the controller can be a simple valve, such as for a pneumatic or hydraulic brake. In some examples, the controller can include circuits for electrically controlling air pressure, hydraulic pressure, or magnetic force.

As will be discussed below, a sensor can be used to secure the stationary portion of a tension generating device to a fixed structure. In certain applications, the sensor can provide an indication of web tension and the indication can be received by the controller to display an estimate for web tension. In some examples, the controller can allow the command signal to the brake to be adjusted such that web tension can be adjusted. This sometimes referred to as open-loop tension control.

In some examples, the sensor can provide an indication of web tension and the indication can be received by the controller to close the tension loop. In a closed loop configuration, the controller can provide an input to adjust a tension setpoint of the machine and the closed loop of the controller can provide a signal to the brake to attain and maintain the web tension indicated by the setpoint.

Figure 1B:
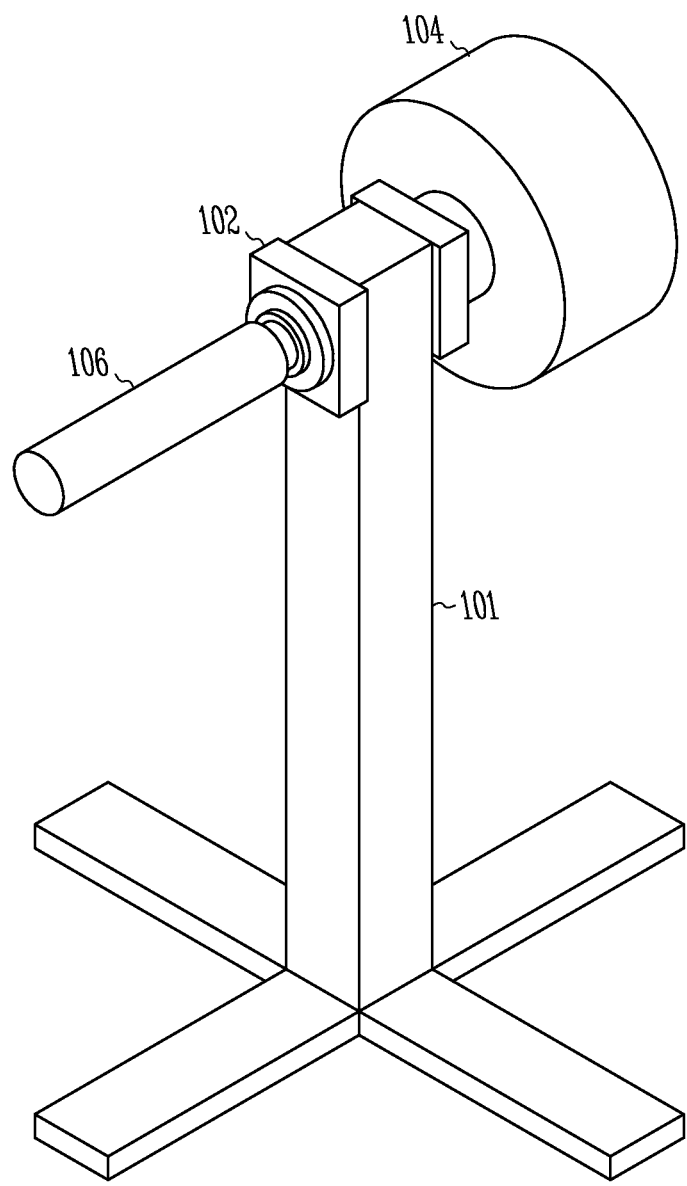
FIG. 1B illustrates an example cantilevered tension control system for a web machine.

FIG. 1B illustrates an example cantilevered tension control system 110 that uses a subset of components of the example system of FIG. 1A. In certain examples, the cantilevered system can include an airshaft 106 mounted to or integrated with the brake shaft.

Figure 2:
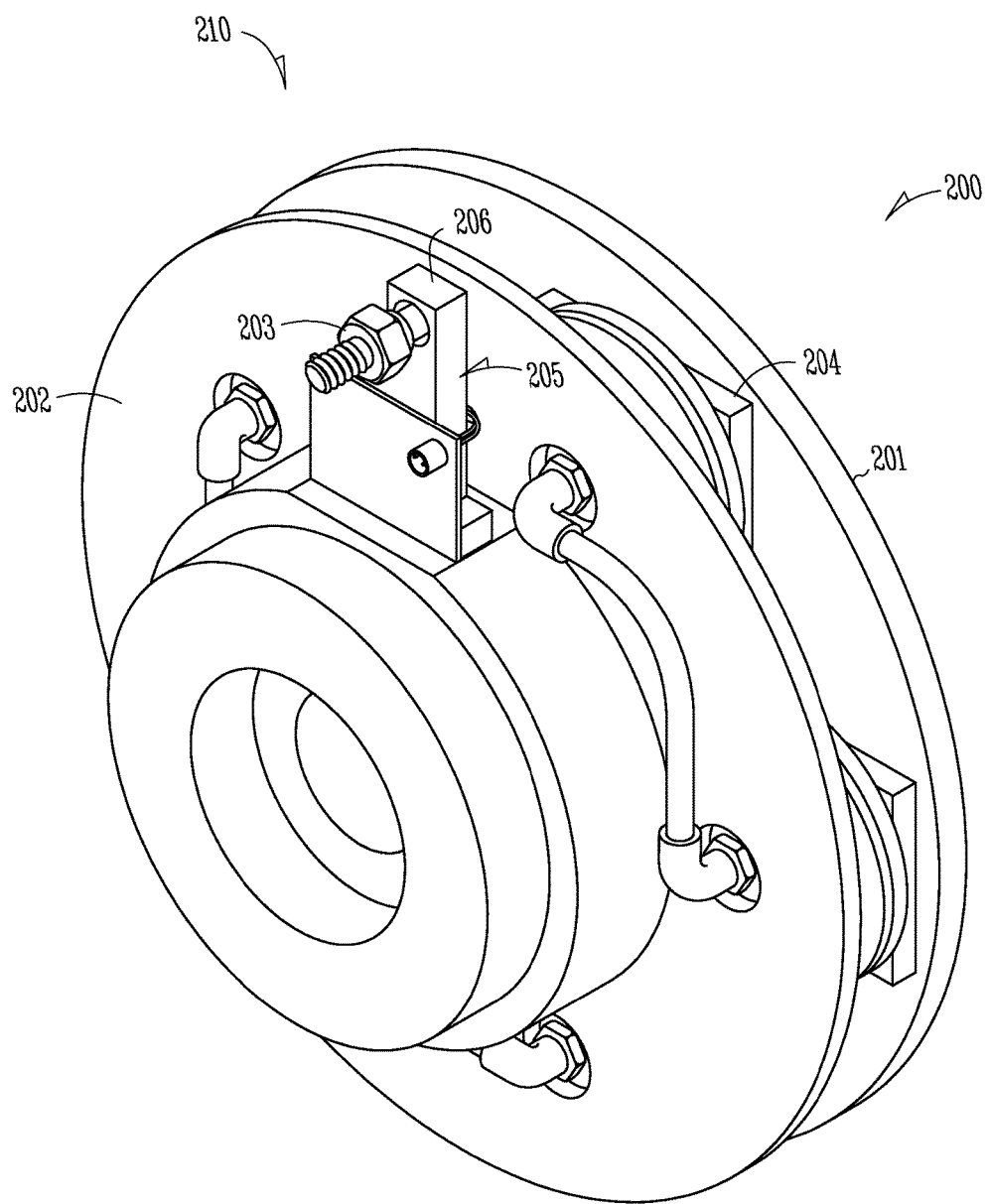
FIG. 2 illustrates an example torque sensor modification for an existing brake tension system.

FIG. 2 illustrates an example anti-rotation pin 203 modification for a brake tension system 210. The brake tension system 210 can include a torque brake 200, an anti-rotation pin 203 and a transducer assembly 205. In certain examples, the threads of the anti-rotation pin 203 can be threaded in to a structural component of the machine, and the opposite end of the anti-rotation pin 203 can protrude thru a bore in the transducer assembly 205. The anti-rotation pin 203, via the transducer assembly 205, can prevent the caliper assembly 202 from rotating and thus, the caliper assembly 202 can provide a stationary member that can be used to generate friction between the brake pads 204 and the brake disk 201.

The force exerted on the anti-rotation pin 203 can be related to the torque applied to the shaft via the brake disk 201 of the torque brake 200. In certain examples, the transducer assembly 205 can include an anti-rotation loop 206 or anti-rotation bore that straddles the anti-rotation pin 203 and contacts the anti-rotation pin 203 when torque is applied by the torque brake 200. The transducer assembly 205 can include a strain gauge (not visible) that can provide a signal related to the force applied to the anti-rotation loop 206 by the anti-rotation pin 203. A transducer interface can process the signal provided by the strain gauge and can provide a visual indication, via a gauge, for example, of the force applied to the shaft. The indication of actual torque applied to the shaft can assist users of open loop tension controls better control tension in a repeatable manner. Such improved tension control can allow experimentation to find the optimum tension for a product and can further result in a more consistent product because torque conditions during processing can be more consistently adjusted and maintained.

Figure 3A:
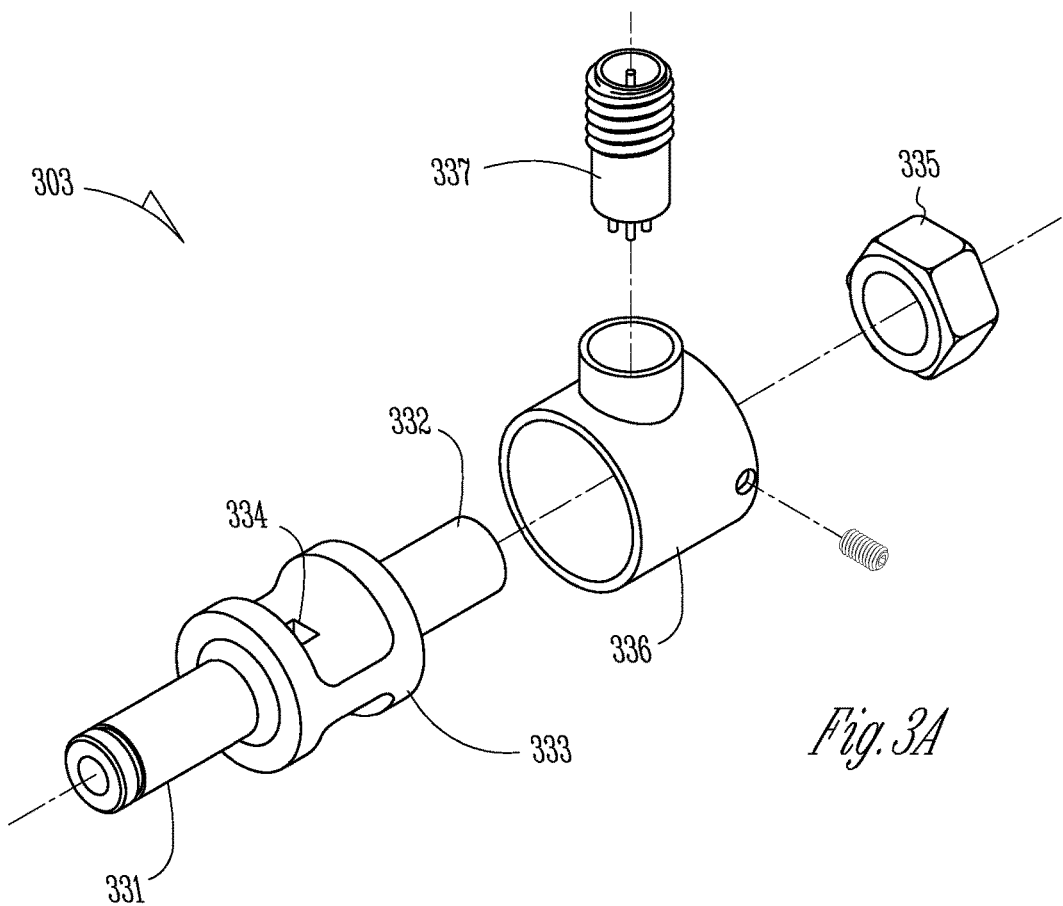
FIGS. 3A and 3B illustrate generally examples of an anti-rotation transducer pin.
Figure 3B:
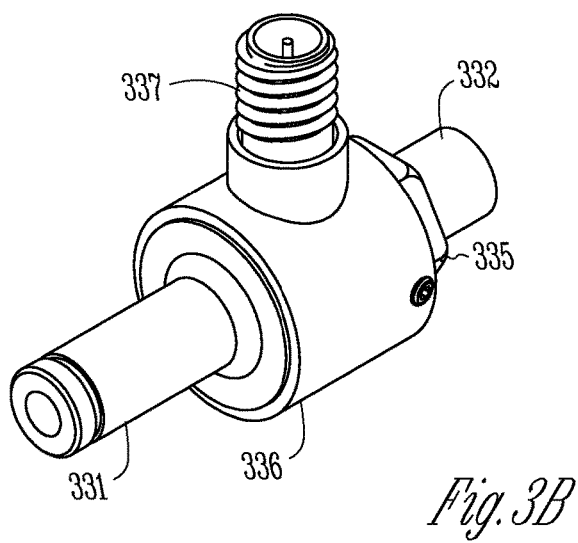

FIGS. 3A and 3B illustrate generally an example anti-rotation transducer pin 303 that can include a transducer and simplify transducer assembly as shown in FIG. 2. In certain examples, the anti-rotation transducer pin 303 can be a direct replacement for an anti-rotation pin. In certain examples, the anti-rotation transducer pin 303 can include a first shaft 331 and a second shaft 332 coupled with a transducer beam 333, and one or more strain gauges 334 coupled to the transducer beam 333. One of the first shaft 331 or the second shaft 332 can be coupled to the caliper assembly of a torque brake and the other shaft can be coupled to the machine. In certain examples, the first or the second shaft 331, 332 can be threaded. In some examples, the first shaft 331 can be integrated with the caliber assembly and the second shaft 332 can be configured to protrude thru a bore in the machine. Such a configuration provides an integrated solution for a tension control brake with torque sensing. In examples with a threaded second shaft 332, the anti-rotation transducer pin can include a locking nut 335 to secure the anti-rotation transducer pin 303 to a machine and prevent subsequent unintended rotation of the anti-rotation transducer pin 303.

The one or more strain gauges 334 can be attached to the transducer beam so as to measure deflection of the beam as force is applied. In certain examples, beam thickness and orientation can be configured for a particular range of torque and corresponding transducer output.

In some examples, the anti-rotation transducer pin 303 can include an optional housing 336. In some examples, the housing 336 can provide a hard stop for the deflection of the transducer beam 333 such that if the anti-rotation transducer pin 303 is subjected to forces mildly over the designed nominal limit of the transducer beam 333, the housing 336 can prevent further deflection of the transducer beam 333. In certain examples, the anti-rotation transducer pin 303 can include an optional electrical connector 337 for easy and quick connection and dis-connection of the electrical leads of the anti-rotation transducer pin 303 with a signal processor or display device.

In certain examples, the anti-rotation transducer pin 303 can provide an improved level of tension control for an application without the high cost associated with integrating a tension roll into the web machine. Although the anti-rotation transducer pin 303 is not directly measuring web tension, the feedback provided from the anti-rotation transducer pin 303 can provide a very robust representation of actual web tension. In some examples, the anti-rotation transducer pin 303 can be used to close a tension control loop when used in association with other sensors to allow conversion of the sensed torque to web tension.

Figure 4:
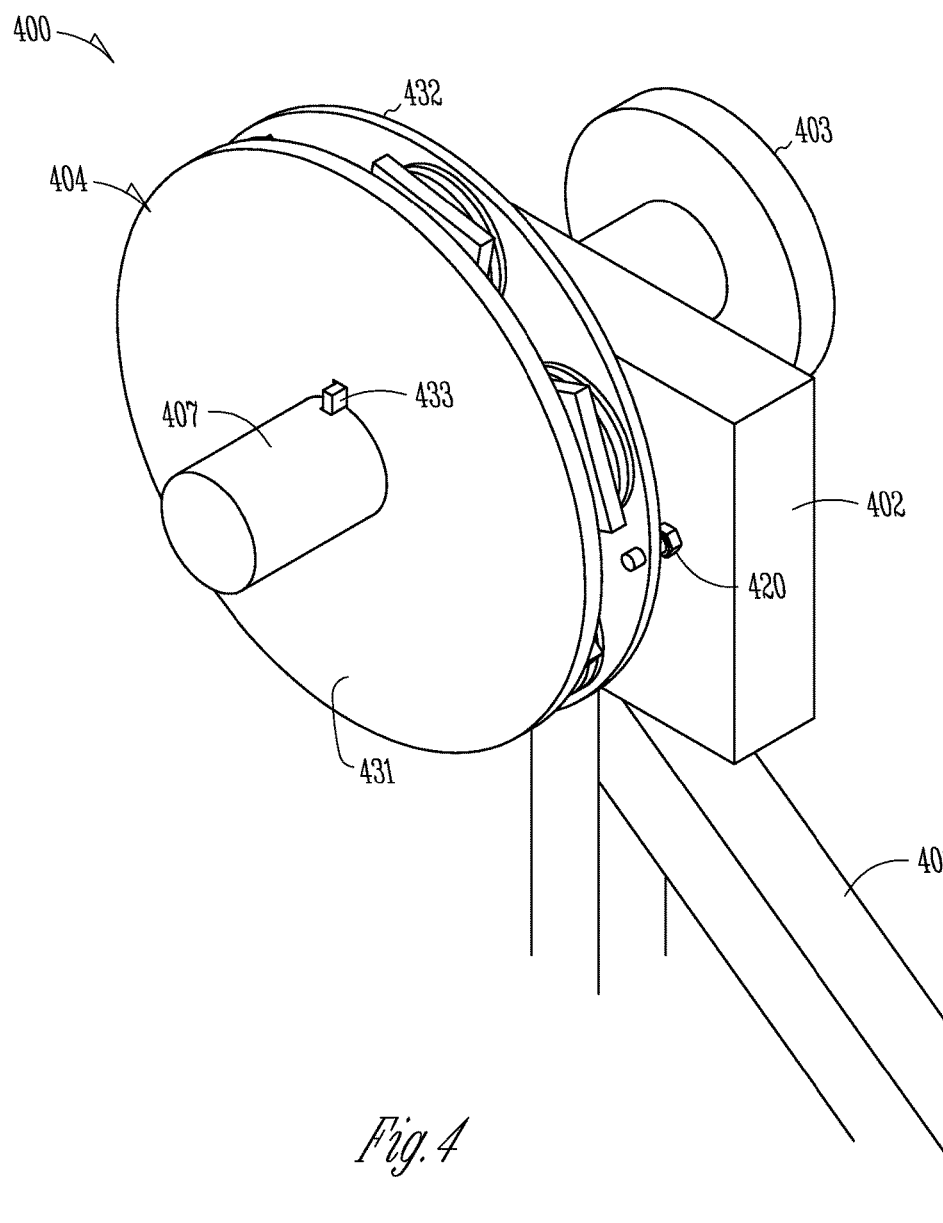
FIG. 4 illustrates an example tension system including an anti-rotation transducer pin.

FIG. 4 illustrates an example tension system including an anti-rotation transducer pin. In certain examples, the system can includes a brake shaft 407, a safety chuck 403 mounted on a first end of the brake shaft 407, a brake 404 slid over the brake shaft 407, a bearing and bearing housing 402 for supporting the brake shaft 407 and an anti-rotation transducer pin 420. The bearing 402 is typically mounted to a support structure 401, for example, the support structure of the machine or station to which the tension system is associated. In certain examples, the rotating member 431 of the brake 404 can be keyed 433 to the brake shaft 407 and can rotate with the brake shaft 407, and a stationary member 432 of the brake 404 can be interfaced with the support structure 401 or bearing housing 402 using the anti-rotation transducer pin 420. In some examples, the anti-rotation transducer pin 420 can be coupled to, for example, threaded into, the stationary member 432 of the brake 404 and upon rotation of the brake shaft 407 can prevent full rotation of the stationary member 401 by interfering with, for example, an edge of the support structure 401 or bearing housing 402, such as but not limited to, an edge of a hole within the support structure 401 or bearing housing 402. In some examples, the anti-rotation transducer pin 420 can be coupled to the support structure 401 or the bearing housing 402 and upon rotation of the brake shaft 407 can prevent full rotation of the stationary member 432 of the brake 404 by interfering with an edge of the stationary member 432, such as but not limited to, an edge of a hole within the stationary member 432.

Assuming some friction-type force existing between the rotating member 431 and the stationary member 432 of the brake, upon rotation of the brake shaft 407, a shear force can be applied to the anti-rotation transducer pin 420 and an indication of the force can be provided on an electrical output of the anti-rotation transducer pin 420. In certain examples, the shear force measured by the anti-rotation transducer pin 420 can be used to estimate web tension. For example, if the F is the force measurement in pounds (lbs.) received from the anti-rotation transducer pin 420, r is the distance from the anti-rotation transducer pin 420 to the center of the brake shaft in inches (in.), d is the diameter of the roll of web material in inches (in.), and w is the width of the web material in inches (in.), the web tension $T_w$ can be determined by, $$TW=(rF/(d/2))/w=2rF/wd \text{(e.g., lbs./in.)}$$

In certain examples, the controller may have one of many methods of estimating or measuring the roll diameter and for receiving a web tension setting. In some examples, the controller can automatically control web tension using the signal from the anti-rotation transducer pin 420 as a tension feedback signal. In some examples, the controller can display a tension, force or torque reading based on the signal received from the anti-rotation transducer pin 420 and the user can manually adjust the braking setpoint to obtain a desired tension, force or torque.

In certain examples, the combination of the tension generating device 404 and the anti-rotation transducer pin 420 can allow for easy tension system replacement or upgrading. This ease of implementation is dramatic compared to alternative methods for upgrading a manual tension system to a closed loop tension system. Such alternative upgrade methods can include labor and expense of locating a suitable position and mounting a tension roll to provide tension feedback while still providing a suitable web path for the existing process. For example, if the anti-rotation transducer pin 420 of the present subject matter is integrated with the brake 404, an upgraded web tension system can be mechanically and easily implemented by sliding the brake onto the brake shaft 407 and providing a bore or edge of a structural component of the machine that can interfere with the rotation of the anti-rotation transducer pin 420. In certain examples, movement of the brake 404 along the shaft can be limited to prevent the brake from slipping off the brake shaft or interfering with other equipment.

Figure 5:
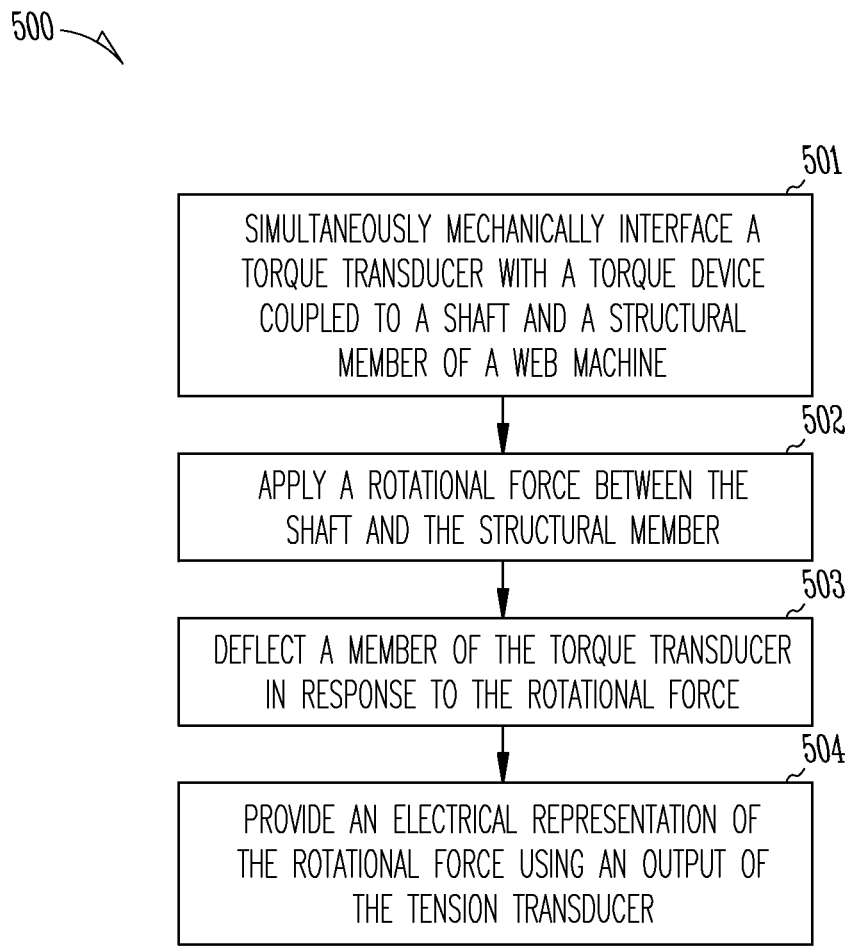
FIG. 5 illustrates generally a flowchart of an example method for operating an example web tension system.

FIG. 5 illustrates generally a flowchart of an example method for operating an example web tension system. At 501, a torque transducer can simultaneously interface with a torque device coupled to a shaft of a web machine, such as a brake coupled to an web unwind shaft, and a structural member of the web machine such a support structure for the web unwind. At 502, a rotational force can be applied between the shaft and the structural member. In certain examples, the force can be a result of web material being pulled of a roll coupled to the shaft in an unwind station. In some examples, the force can result from a motor turning the shaft such as to rewind material of a web machine onto a roll. At 503, the rotational force can deflect a member of the tension transducer such as a tension beam or mirror in the case of an optical strain sensor. At 504, the tension transducer can provide an electrical indication of the rotational force at an output.

In certain examples, male threads of the torque transducer can be interfaced with female threads of the torque device to provide a portion of the simultaneous interface. In some examples, a bore in the structural member to accommodate an end of the torque device such as an anti-rotation transducer pin to provide a portion of the simultaneous interface. In some example the end of the torque device can be an end opposite the male threads. In some examples, the torque device can be a brake, a clutch, a motor, or a combination thereof. In certain examples, the torque tension can include a strain gauge. In some examples, the torque tension can include an optical strain gauge.

EXAMPLES AND ADDITIONAL NOTES

In Example 1, an apparatus can include a tension beam configured to deflect in a predictive manner when under a force load, a first shaft directly coupled to the tension beam and configured to mechanically interface with a torque device, a second shaft directly coupled to the tension beam opposite the first shaft and configured to interface with a structural member of a web machine, and a strain gauge coupled to the tension beam and configured to provide an electrical representation of the force load.

In Example 2, an exterior of the first shaft of Example 1 optionally includes male threads configured for reception within female threads of the torque device.

In Example 3, an exterior of the second shaft of any one or more of Examples 1-2 optionally is configured for reception within a bore of the structural member.

In Example 4, the apparatus of any one or more of Examples 1-3 optionally includes the torque device.

In Example 5, the torque device any one or more of Examples 1-4 optionally includes a brake;

In Example 6, the torque device any one or more of Examples 1-5 optionally includes a clutch;

In Example 7, the torque device any one or more of Examples 1-6 optionally includes a motor.

In Example 8, the apparatus of any one or more of Examples 1-7 optionally includes a controller configured to receive a tension setpoint, to provide a force command to the torque device, to receive the electrical representation of the force load and to close a tension control loop using a comparison of a representation of the electrical representation and a representation of the setpoint to provide the force command.

In Example 9, an exterior of the second shaft any one or more of Examples 1-8 optionally includes male threads configured for reception within female threads of the structural member.

In Example 10, an exterior of the first shaft of any one or more of Examples 1-9 optionally is configured for reception within a bore of the torque device.

In Example 11, a method for measuring web tension can include simultaneously interfacing a torque transducer with a torque device coupled to a shaft associated with a roll of web material and with a structural member of a structure configured to support the shaft, applying a rotation force between the shaft and the structural member, deflecting a member of the torque transducer in response to the relative rotation force, and providing an electrical representation of the rotation force using an output of the tension transducer.

In Example 12, the simultaneous interfacing any one or more of Examples 1-11 optionally includes interfacing male threads of the torque transducer with female threads of the torque device.

In Example 13, the simultaneous interfacing any one or more of Examples 1-12 optionally includes interfacing a structural portion of the torque transducer within a bore of the structural member, wherein the structural portion of the torque transducer includes an end of the torque transducer opposite the male threads.

In Example 14, the simultaneous interfacing any one or more of Examples 1-13 optionally includes interfacing male threads of the torque transducer with female threads within the structural member.

In Example 15, the simultaneous interfacing any one or more of Examples 1-14 optionally includes interfacing a structural portion of the torque transducer within a bore of the torque member, wherein the structural portion of the torque transducer includes an end of the torque transducer opposite the male threads.

In Example 16, the simultaneously interfacing a torque transducer with a torque device of any one or more of Examples 1-15 optionally includes interfacing a torque transducer with a brake.

In Example 17, the simultaneously interfacing a torque transducer with a torque device of any one or more of Examples 1-16 optionally includes interfacing a torque transducer with a clutch.

In Example 18, the simultaneously interfacing a torque transducer with a torque device of any one or more of Examples 1-17 optionally includes interfacing a torque transducer with a motor.

In Example 19, the deflecting a member of the torque transducer any one or more of Examples 1-18 optionally includes deflecting a tension beam of the torque transducer, and the providing an electrical representation of the rotation force any one or more of Examples 1-18 optionally includes providing an electrical representation of the rotation force using a strain gauge coupled to the tension beam.

In Example 20, the torque transducer any one or more of Examples 1-19 optionally can include an optical strain gauge.

In Example 21, the method of any one or more of Examples 1-20 optionally includes receiving a tension setpoint at a tension controller, providing a force command from the controller to the torque device, receiving the electrical representation of the force load at the controller, and closing a tension control loop using a comparison of a representation of the electrical representation and a representation of the setpoint to provide the force command.

A system or apparatus can include, or can optionally be combined with any portion or combination of any portions of any one or more of the examples or illustrations above to include, means for performing any one or more of the functions described above, or a machine-readable medium including instructions that, when performed by a machine, cause the machine to perform any one or more of the functions described above.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document, for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An apparatus comprising:
   a torque device comprising a clutch or a motor;
   a tension beam;
   a first shaft directly coupled to the tension beam and configured to mechanically interface with the torque device;
   a second shaft directly coupled to the tension beam opposite the first shaft and configured to interface with a structural member of a web machine; and
   a strain gauge coupled to the tension beam and configured to provide an electrical representation of a shear force load applied to at least one of the first shaft or the second shaft.

2. The apparatus of claim 1, wherein an exterior of the first shaft includes male threads configured for reception within female threads of the torque device.

3. The apparatus of claim 2, wherein an exterior of second shaft is configured for reception within a bore of the structural member.

4. The apparatus of claim 1, including a controller configured to receive a tension setpoint, to provide a force command to the torque device, to receive the electrical representation of the force load and to close a tension control loop using a comparison of a representation of the electrical representation and a representation of the setpoint to provide the force command.

5. The apparatus of claim 1, wherein an exterior of the second shaft includes male threads configured for reception within female threads of the structural member.

6. The apparatus of claim 5, wherein an exterior of the first shaft is configured for reception within a bore of the torque device.

7. A method for measuring web tension, the method comprising:

simultaneously interfacing a torque transducer with a torque device coupled to a shaft associated with a roll of web material and with a structural member of a structure configured to support the shaft;

applying a rotation force between the shaft and the structural member;

deflecting a member of the torque transducer in response to the relative rotation force; and providing an electrical representation of the rotation force using an output of the tension transducer.

8. The method of claim 7, wherein the simultaneous interfacing includes interfacing male threads of the torque transducer with female threads of the torque device.

9. The method of claim 8, wherein the simultaneous interfacing includes interfacing a structural portion of the torque transducer within a bore of the structural member, wherein the structural portion of the torque transducer includes an end of the torque transducer opposite the male threads.

10. The method of claim 7, wherein the simultaneous interfacing includes interfacing male threads of the torque transducer with female threads within the structural member.

11. The method of claim 10, wherein the simultaneous interfacing includes interfacing a structural portion of the torque transducer within a bore of the torque member, wherein the structural portion of the torque transducer includes an end of the torque transducer opposite the male threads.

12. The method of claim 7, wherein the simultaneously interfacing a torque transducer with a torque device includes interfacing a torque transducer with a brake.

13. The method of claim 7, wherein the simultaneously interfacing a torque transducer with a torque device includes interfacing a torque transducer with a clutch.

14. The method of claim 7, wherein the simultaneously interfacing a torque transducer with a torque device includes interfacing a torque transducer with a motor.

15. The method of claim 7, wherein deflecting a member of the torque transducer includes deflecting a tension beam of the torque transducer; and wherein the providing an electrical representation of the rotation force includes providing an electrical representation of the rotation force using a strain gauge coupled to the tension beam.

16. The method of claim 7, wherein the torque transducer can include an optical strain gauge.

17. The method of claim 7 including:

receiving a tension setpoint at a tension controller;

providing a force command from the controller to the torque device, receiving the electrical representation of the force load at the controller; and closing a tension control loop using a comparison of a representation of the electrical representation and a representation of the setpoint to provide the force command.

18. An apparatus comprising:

a tension beam;

a first shaft directly coupled to the tension beam and configured to mechanically interface with a torque device;

a second shaft directly coupled to the tension beam opposite the first shaft and configured to interface with a structural member of a web machine;

a strain gauge coupled to the tension beam and configured to provide an electrical representation of a shear force load applied to at least one of the first shaft or the second shaft; and a controller configured to receive a tension setpoint, to provide a force command to the torque device, to receive the electrical representation of the force load and to close a tension control loop using a comparison of a representation of the electrical representation and a representation of the setpoint to provide the force command.

19. The apparatus of claim 18., wherein an exterior of the first shaft includes male threads configured for reception within female threads of the torque device.

20. The apparatus of claim 19, wherein an exterior of the second shaft is configured for reception within a bore of the structural member.

21. The apparatus of claim 18, wherein the torque device is one of a brake, a clutch, or a motor.

* * * * *

UNITED STATES PATENT AND TRADEMARK OFFICE
CERTIFICATE OF CORRECTION

PATENT NO. : 9,783,385 B2  
APPLICATION NO. : 14/823418  
DATED : October 10, 2017  
INVENTOR(S) : Lefebvre et al.

Page 1 of 1

It is certified that error appears in the above-identified patent and that said Letters Patent is hereby corrected as shown below:

In the Claims

In Column 8, Line 50, in Claim 3, after "of", insert --the--

In Column 10, Line 34, in Claim 19, delete "claim 18.," and insert --claim 18,-- therefor Signed and Sealed this  
Fourth Day of June, 2019

Andrei Iancu  
*Director of the United States Patent and Trademark Office*